United States Patent [19]
Søgaard

[11] Patent Number: 5,980,592
[45] Date of Patent: Nov. 9, 1999

[54] METHOD OF PROCESSING PROBLEMATIC, ORGANIC, CHEMICAL WASTES, AND A PLANT FOR CARRYING OUT THE METHOD

[75] Inventor: Dennis Søgaard, Svendborg, Denmark

[73] Assignee: RAG Umweltrohstoffe GmbH, Bottrop, Germany

[21] Appl. No.: 08/981,422

[22] PCT Filed: Jun. 23, 1996

[86] PCT No.: PCT/DK96/00264

§ 371 Date: Dec. 23, 1997

§ 102(e) Date: Dec. 23, 1997

[87] PCT Pub. No.: WO97/01064

PCT Pub. Date: Jan. 9, 1997

[30] Foreign Application Priority Data

Jun. 23, 1995 [DK] Denmark .................. 0721/95

[51] Int. Cl.⁶ .............. B01J 13/00; B02C 1/00; C10L 7/02; F23G 5/02
[52] U.S. Cl. .................. 44/265; 44/502; 241/16; 241/DIG. 38; 366/348; 516/31; 516/77; 516/930
[58] Field of Search .............. 252/314, 315.01; 44/265, 502, 595; 588/207, 900; 516/31, 77, 930; 241/16, DIG. 38; 366/348

[56] References Cited

U.S. PATENT DOCUMENTS

| | | | |
|---|---|---|---|
| 3,951,849 | 4/1976 | Vickery et al. ............. | 252/314 X |
| 4,133,273 | 1/1979 | Glennon ................. | 110/346 |
| 4,164,396 | 8/1979 | Jones .................. | 44/502 |
| 4,320,709 | 3/1982 | Hladun ................. | 588/900 X |
| 4,419,943 | 12/1983 | Faurholdt .............. | 588/900 X |
| 5,191,155 | 3/1993 | Driemel et al. .......... | 588/207 X |

FOREIGN PATENT DOCUMENTS

| | | | |
|---|---|---|---|
| 0 073 787 | 3/1982 | European Pat. Off. . | |
| 0 288 913 | 11/1988 | European Pat. Off. . | |
| 0 439 645 | 8/1991 | European Pat. Off. . | |
| 2 702 488 | 9/1994 | France . | |
| 39 00482 | 2/1990 | Germany . | |
| 2265319 | 9/1993 | United Kingdom ........ | 588/900 |
| WO 82/03112 | 9/1982 | WIPO . | |
| WO 91/01185 | 2/1991 | WIPO . | |
| WO 94/09319 | 4/1994 | WIPO . | |

*Primary Examiner*—Richard D. Lovering
*Attorney, Agent, or Firm*—Pillsbury Madison & Sutro

[57] ABSTRACT

A method and a plant for processing problematic, organic, chemical wastes for the disposal thereof. The different types of waste are collected in separate portions and the liquid waste portions are pooled, and the resulting liquid mixture is left to separate into a number of fractions. Each viscous or solid waste portions is subjected to a compatibility test with a liquid fraction. The waste portions are admixed with an amount of a compatible liquid fraction, ensuring that a workable mixture is obtained. The different mixtures are gradually mixed and a mixed and workable buffer portion is obtained. The buffer portion or a portion thereof is subjected to grinding at a high shear. A pumpable, combustible dispersion is obtained, which can be incinerated without any risk of explosions.

21 Claims, 6 Drawing Sheets

METHOD OF PROCESSING PROBLEMATIC, ORGANIC, CHEMICAL WASTES, AND A PLANT FOR CARRYING OUT THE METHOD

This application is a 371 of PCT/DK 96/00264 filed Jun. 18, 1996.

TECHNICAL FIELD

The present invention relates to a method of processing liquid, solid and/or viscous, problematic, organic chemical wastes for the disposal thereof, if possible using the calorific value of the waste, and a plant for carrying out the method.

BACKGROUND ART

Today's industrial production leaves many types of waste materials, including chemical waste materials, which for environmental reasons have to be disposed of, i.e. converted into an environmentally acceptable form, by incineration, for instance in a rotary furnace. At incineration in a rotary furnace, the calorific value of the problematic waste can be utilized. If, after incineration, the waste type leaves ashes or cinders, the disposal of which may still cause environmental problems, it may be advantageous to incinerate the waste in a cement kiln, confer as an example WO publication No. nr. 94/09319.

Some of the problematic waste materials are difficult to handle, as they are in a solid or pastose form. Such materials are difficult to feed into a combustion furnace under stable conditions, so that a fairly constant and sufficiently high combustion temperature can be maintained. In order to ensure a uniform and adjustable feeding of the waste material, it is advantageous, if the material is easily converted into a pumpable material.

EP patent No. 73.787 discloses a method of processing a nonpumpable, solid or viscous problematic waste material, such as discarded paints, paint sludge, greasy wastes, distillation residues, which may contain oil sludge, organic compounds and the like, wherein the waste is subjected to a mechanical reduction in size and simultaneously or subsequently dispersed with water to saturation at mechanical mixing, whereby a pumpable dispersion is obtained, which can be used as a fuel. However, experience has shown that this method cannot be used for all types of waste.

Another problem when incinerating chemical wastes is that certain types of waste may be highly active, whereby explosions may occur, if high concentrations of said wastes are fed into a combustion furnace.

Certain types of particularly active wastes may cause problems in form of heavy exothermic reactions creating explosions merely by being vigorously ground.

WO publication No. 91/01185 discloses a method for utilizing residues and waste waters from paint shops and lacquer processing installations, in particular lacquer and paint sludges, and colorant waste from the automobile industry, i.a. by utilizing the calorific value of the organic compounds contained therein. By this method, the varying and possibly mechanically drained residues are collected separately in closed transport containers from the different places, in which the waste occurs, and transported to a central processing and utilization plant. In this plant, the residues, containing volatile organic compounds and/or water under the selected process conditions, are dried and ground in a heated, continuously driven contact drier at 120° C. to 250° C. under a slight vacuum and while being kneaded and mixed. For some types of waste, such a drying process at an increased temperature results in caking or hardening, which makes it impossible to convert the waste material into a pumpable form, which may be injected through a nozzle into a combustion furnace at a later stage. Moreover, there is a risk of explosions when drying at such high temperatures.

DE patent No. 3.900.482 discloses a method for the disposal of lacquer and paint sludges and colorant wastes, in particular from the automobile industry, wherein the wastes, subsequent to any thorough separation of volatile solvents and possibly while being cooled, are ground and mixed with at least the same quantity of coal dust and possibly with alkaline additives, preferably quicklime and/or limestone powder, whereafter it may be burnt. This method cannot either be used for the most difficult types of chemical wastes, in particular such wastes leaving a solid mass which is difficult to grind or cannot be ground at all, subsequent to removal of any solvents.

EP patent application No. 288.913 discloses a method for disposal of acid-soluble materials, wherein the materials initially are dissolved in a strong acid, whereafter the solution is fed into an incineration plant. However, this method is generally not usable with varying types of chemical wastes.

FR published specification No. 2.702,488 discloses a method for the preparation of fuel especially from industrial waste, in which portions of a reasonably homogeneous composition are prepared, a large number of chemical and physical analyses are performed on each portion, the amounts of material from the available, analyzed portions which can be combined to obtain pastose or viscous fuel are determined, solid wastes are ground to a particle size of between 10 or 25 mm and amounts thereof are added to the other constituents and admixed to a fuel material having a viscosity of preferably 150 poise, i.e. 15 Pa·s. Some of the analyses performed are chemical analyses of different harmful substance, such as chlorine, sulphur and heavy metals to ensure that the end fuel is within the the maximum limit values set by the authorities. The intercompatibility of the different solid and liquid waste portions is thus not tested, whereby such a possible compatibility cannot be utilized optimally to dissolve or swell the solid or viscous waste constituents to obtain an advantageous reduction in the viscosity. According to the French patent a piston pump, such as a concrete pump, is required for pumping of the prepared high-viscose fuel, as a high pump pressure is required, e.g. 150 bar (15 MPa). The material is thus not so liquid that it can be pumped at a considerably lower pressure, which is used in a single-stage centrifugal pump having a pump pressure of typically 3–4 bar (0.3–0.4 MPa).

BRIEF DESCRIPTION OF THE INVENTION

The object of the invention is to provide a universally applicable method of processing various types of chemical wastes under the formation of a pumpable dispersion of the waste, which, without any risk of explosions, may be fed through a nozzle into a combustion furnace, for instance a rotary furnace for cement production. A further object of the invention is to provide a plant for carrying out of the method.

This object is obtained by means of a method of processing liquid, solid and/or viscous, problematic, organic chemical wastes for the disposal thereof, if possible by using the calorific value of the waste, said method comprising the following steps:

a) a means for collecting the different types of waste, including liquid portions, solid or viscous portions and multi-phased portions in large or small, separate portions;

b) the liquid phases are drained from multi-phased portions to achieve further liquid portions and solid or viscous portions, respectively, c) the liquid waste portions are pooled, and the achieved liquid mixture is left to separate into a number of fractions (I,II, . . . ), each fraction subsequently being transferred to a reservoir, d) each of the viscous or solid waste portions is subjected to a compatibility test to determine whether the waste portion is soluble or swellable in one of the liquid fractions, said compatibility tests being carried out by adding a small sample of liquid fraction, e) the waste portions, displaying solubility or swellability with one of the liquid fractions designated waste type (I, II . . . ), are admixed with an amount of the fraction, ensuring that a workable mixture is obtained, whereby a number of mixtures is obtained, each designated as the relevant mixture type (I,II . . . ), f) the different mixtures are gradually admixed during further processing, if necessary, subsequent to preceding trial mixing of samples thereof, and possibly during admixing of additional liquid, so that a mixed and workable buffer portion is obtained as a result, said buffer portion containing a combination of the mixture types (I,II . . . ), any excess waste portions or mixtures being left for mixing with subsequent waste portions or mixtures, g) the buffer portion or a portion thereof is subjected to grinding at a high shear to form a pumpable, combustible material, which can be used as a fuel.

Moreover, the invention relates to a waste processing plant for carrying out the method according to the invention, said waste processing plant being characterised essentially by components for performing the steps of the above-described method.

A preferred embodiment of the waste processing plant will be decserided below.

The waste is supplied to the waste processing plant as portions, preferably in barrels, from which the liquid phase is drained. Each of these drained portions is emptied separately into a tank via the inlet opening thereof, whereby the waste supplied to the container will remain in small portions. As a result, the risk of explosions is considerably reduced compared to plants, in which the individual portions are mixed immediately. By means of the shovel or bucket means, each of the viscous or solid waste portions in the individual tanks is subjected to a compatibility test and mixed in accordance with the method according to the invention, until a mixed and workable buffer portion with the desired mixture of wastes is obtained.

This waste mixture is advantageously led from the outlet opening in the outer wall of the container to the inlet of an intermediate mixer.

The capacity of the intermediate mixer is comparatively large. As a result, the mixture being fed to the intermediate mixer is diluted by the waste material already present in the mixer, whereby any explosive mixture fed into the outlet opening of the container is diluted at least by five times in the intermediate mixer.

Preferably, the intermediate mixer is connected to an end mixer, which may grind the waste material with a high shear by means of the power-driven stirring means provided in the end mixer.

However, if an explosion beyond a certain critical size occurs in the interior of the container, the upper part of the container is lifted off, if this is retained to the lower part by means of its weight as will be described below. The upper part may also be retained to the lower part by means of bolts bursting at a load corresponding to the maximum allowable pressure in the interior of the container.

The container may advantageously be made of steel. The inner face of the lower part may be coated with a chemically resistant material.

It may be advantageous to form the ground plan of the container in a manner such that a comparatively compact waste processing plant is obtained. Specifically, the ground plan of the container can be formed as a section of a circle with the partition walls of the lower part extending as radii in the circle, the outer walls can include curved outer walls which lie on the section of the circle and which each have an inner face, and the shovel or bucket means can be an excavator arranged in a stationary manner in the centre of the circle and provided with a bucket arm having a bucket, said arm being arrangeable above any of the tanks by revolving about the centre of the circle and having a maximum extension, whereby the bucket does not completely abut the inner faces of the curved outer walls.

However, if more than six or seven tanks are desired in the waste processing plant, it may be necessary to form the ground plan of the container in such that the ground plan is rectangular, the partition walls of the lower part extend parallel with the short sides of the rectangle and the shovel or bucket is a travelling crane slidable in the longitudinal direction of the rectangle on a track parallel with the long sides of the rectangle, whereby the number of tanks obtainable is unlimited.

The extent of applicability of the invention appears from the following detailed description. It should, however, be understood that the detailed description and the specific examples are merely included to illustrate the preferred embodiments, and that various alterations and modifications within the scope of protection will be obvious to persons skilled in the art on the basis of the detailed description.

The method according to the invention makes it possible to convert problematic, organic wastes into a pumpable, storage stable, and transportable dispersion, which can be used as a valuable fuel, for instance in a rotary furnace for cement production. In the present context, the term dispersion is to be understood as broadly as possible, as in fact it covers emulsions, suspensions, mixtures, dispersions, and solutions. At the use of different kinds of solvents, which may comprise organic solvents of various types and possibly water, the method is considerably more all round applicable than the method according to EP 73.787.

An essential feature of the method is that by combining different waste types, the dissimilarities thereof are utilized to obtain the desired pumpable, combustible dispersion, which at least as regards the handling thereof may be considered homogeneous. The preparation of a homogeneous or uniform dispersion ensures a homogeneous calorific value ensuring a stable combustion at a stable combustion temperature. One advantage of the mixture is that a problem is avoided occurring at the conventional destruction of chemical wastes, for instance as at Kommunekemi in Nyborg, Denmark, i.e. that explosions easily happen when a high concentration of a highly active substance is fed too quickly into combustion furnace.

Moreover, it is an essential advantage of the present invention that different solvents are used to soften and disperse the solid or viscous portion of the waste. In practise, the above is carried out by mixing the "used" organic solvents received at the waste disposal plant, whereby, statistically, a very multiple mixture is obtained, said mixture separating into two or several phases on standing. Consequently, a nonpolar phase having a high content of aromatic solvents and a polar phase containing alcohols, esters, ketones, and usually also water, may be formed. On standing, the separated phases are at the top and at the bottom, respectively, of the container, in which they have been placed. Which of the phases being at the top and at bottom depends on the specific gravity. Usually, the polar phase is at the bottom, but it may at times be at the top. In the intermediate level between the non-polar phase and the polar phase, often one or more transition phases are present. It is thus possible to separate the solvent mixture into a number of fractions (I,II . . . ), each fraction subsequently being transferred to a reservoir.

Naturally, the sources of the wastes received determine whether sufficient solvent is available for carrying out the method without additionally purchased solvent being used. In most cases, it is only necessary to add water to the intermediate mixer in step f) to obtain the desired pumpability. However, if distribution of the types of wastes received is not satisfactory, and/or if a particularly problematic waste type is received, the addition of selected types of solvents is advantageous.

Wastes usually in form of solid or pastose residues, which are difficult to handle are generally received in large or small portions, the composition of which is more or less Known. The waste types may be:

Wastes from the paint and lacquer industry. These may comprise binder residues, faulty or imperfect binders and discarded paints.

Waste from spray-painting.
Sediments from oil tanks.
Lubricating grease wastes.
Various natural or synthetic resins.
Distillation residues from oil products and bitumen.
Distillation residues from reuse of solvents
By-products from organic synthesis.
Polymer residues.

Gradually, as the individual waste portions are received at the waste processing plant, said portions are placed separately in containers, for instance in adjacent vessels or tanks arranged in a common chamber, preferably being gasproof, and in which the waste can be handled by means of an excavator operated from the outside. The operator may supervise the process course either through windows, a tv-monitor or in a another way.

A protective atmosphere of an inert gas, for instance $N_2$ and or $CO_2$, may be provided in the common chamber, whereby the risk of exothermic oxidation processes is reduced. As a rule, the common chamber and the associated piping systems form a closed system with the inert atmosphere, which may be connected to the atmosphere via a gas filter.

For each of the waste portions received, a test for compatibility with the solvent fractions I, II . . . is carried out.

Some of the waste portions are compatible with one of the fractions, and these may be dissolved or softened in the solvent immediately under the formation of a more or less pumpable dispersion.

Other waste portions are only able to swell in one of the solvent fractions and thus require a more heavy grinding.

On the basis of the compatibility tests carried out, the most suitable solvent fraction is added, whereafter the individual portions are mixed. As a rule, the portions being compatible with the same solvent fraction may be mixed directly. The portions, which are only swellable can then be added, until a critical ratio is reached determined by mixing small samples thereof.

The obtained solvent containing waste portions may then be mixed with solvent containing waste portion of a different type (I,II . . . ). This can be made in the same manner as described above, i.e. after a test has shown how much one portion can "tolerate" of the other portion.

In this manner, every waste portion is dealt with, the waste types difficult to handle being added to the easily dispersed portions in a tolerable quantity for maintaining a sufficient workability.

The mixing may either be carried out in the individual tanks by means of the excavator or another shovel or bucket means, or in a special mixing means, also called an intermediate mixer.

The initial mixing described above, taking place in the individual tanks by means of a shovel or bucket means, may be carried out in a comparatively cautious manner, i.e. involving a moderate shear. As a result, the risk of violent, exothermic reactions, deflagrations or even explosions is avoided, which otherwise might occur, when a highly active, concentrated chemical waste is subjected to heavy grinding with high shear.

The intermediate mixer may advantageously have a relatively large capacity, typically 5–20 $m^3$, such as approximately 10 $m^3$ so as to contain a large amount of waste acting as a buffer portion. Such a buffer portion may advantageously act to equalize the heterogeneousness of the incoming waste portions, whereby the risk of explosions due to too high concentrations of a particularly active waste is avoided. Furthermore, a more uniform calorific value is obtained. Using a buffer portion increases the possibility of disposing of the most problematic waste types, which are only slightly compatible with the used solvent mixtures, as small portions thereof can be added very slowly to the buffer portion over a long period of time.

The intermediate mixer may be any type of mixer ensuring a thorough mixing combined with a moderate shear.

In case of particularly problematic waste types, a good result is often ensured, if a sufficient amount of fine-grained solid particles of a maximum size of 100 $\mu$m, preferably maximum 60 $\mu$m, is present. Such particles are present in some instances, such as pigments from paints, but they can be added as required to the individual tank or to the buffer portion in the intermediate mixer, e.g in form of coal dust, filter dust, cellulose waste, fine-grained plastic granulate, bentonite or the like.

The admixed and harmonized waste portions with added solvent present in the intermediate mixer, is gradually led to grinding in an end mixer, wherein the material is subjected to stirring conditions involving a high shear.

A minor portion of the mixed buffer portion may advantageously be removed, for instance 10–50 percent, preferably 20 percent, for further processing in the end mixer. In some instances, additional solvent may be added in the end mixer, often in form of water, to obtain the desired viscosity.

In preliminary experiments this resulted in a pumpable dispersion having a viscosity at 20° C. on 50–200 centistoke ($0.5 \times 10^{-4}$–$2 \times 10^{-4}$ $m^2$/sec.), preferably approximately 100 centistoke ($1 \times 10^{-4}$ $m^2$/sec). This dispersion may be pumped using a conventional single-stage centrifugal pump through a nozzle and atomized as a fuel in a rotary furnace for making cement.

Further experiments have been carried out, in which the viscosity of the pumpable dispersion was measured in Pa·s. In this experiment the preferred viscosity was found to be from about 0.27 to 0.85 Pa·s, and the dispersion was remained pumpable with a viscosity up to about 1 Pa·s using a conventional single-stage centrifugal pump with a pumping pressure of about 0.3 to 0.4 MPa. Such a viscosity may be advantageous in some instances, if the amount of liquid waste is limited.

When comparing the above results in centistokes (=100 stokes) with the results in Pa·s, it is notable that at a density of 1000 kg/m$^3$ 1 stoke is equal to 1 poise=0.1 Pa·s.

The term buffer portion particularly denotes a comparatively large portion of mixed wastes containing liquid fraction as required. However, the term buffer does not necessarily refer to the size of the waste portion, but merely indicates that it acts as a buffer balancing the properties of the different types of chemical waste at the mixing thereof and thus the dilution of each single chemical component obtained thereby. Consequently, it is possible to work with small buffer portions, however, ensuring that the contents of the particularly active chemical waste as well as the contents of the waste portions, having a more or less unknown composition, are sufficiently balanced (diluted) in the buffer portion.

BRIEF DESCRIPTION OF THE DRAWINGS

Embodiments for a waste processing plant for carrying out the method according to the invention are described in details in the following with reference to the drawings, in which.

BEST MODE FOR CARRYING OUT THE INVENTION

Figure 1:
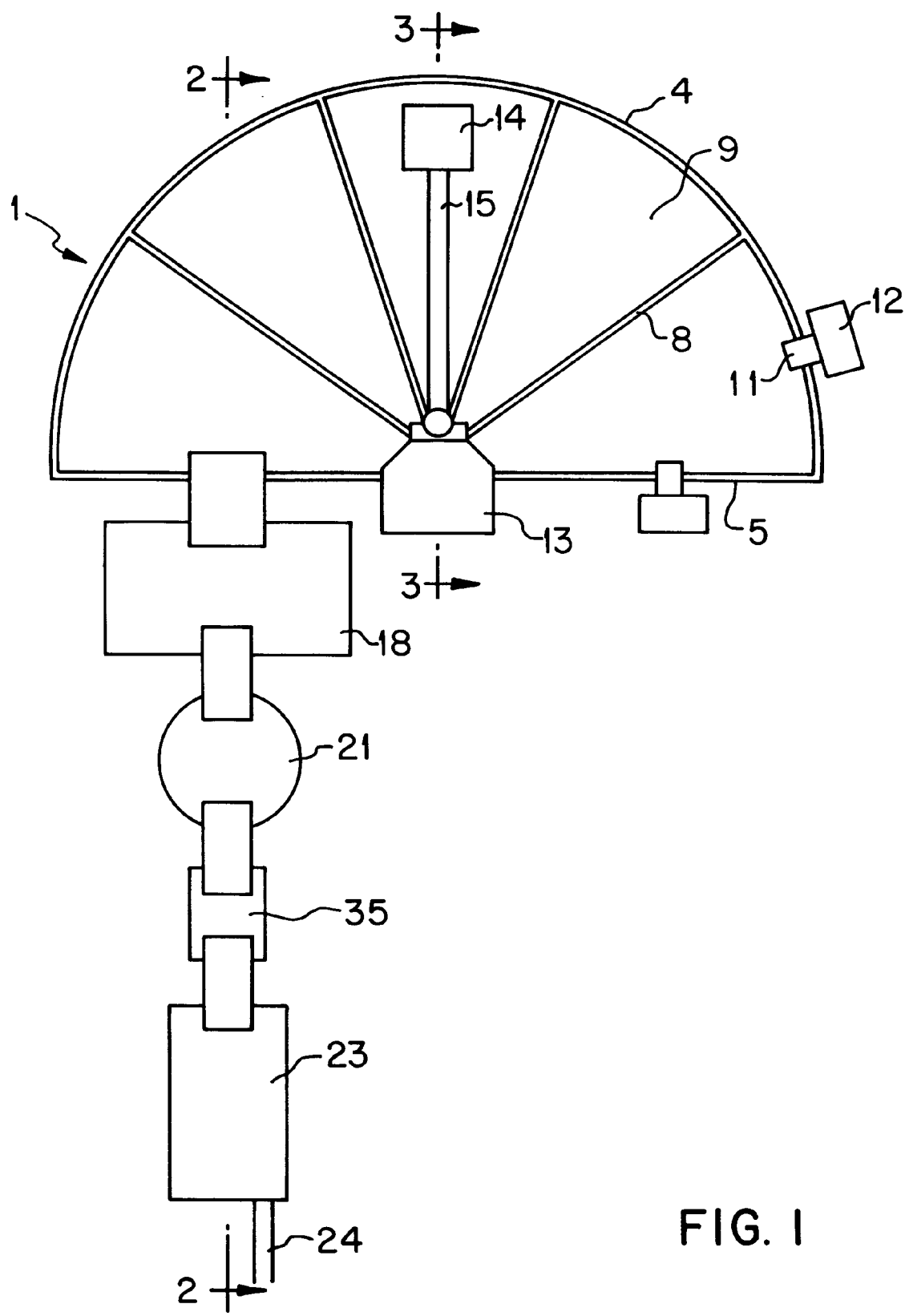
FIG. 1 illustrates in a diagrammatic and simplified form the waste processing plant in a top view without the upper part.
Figure 2:
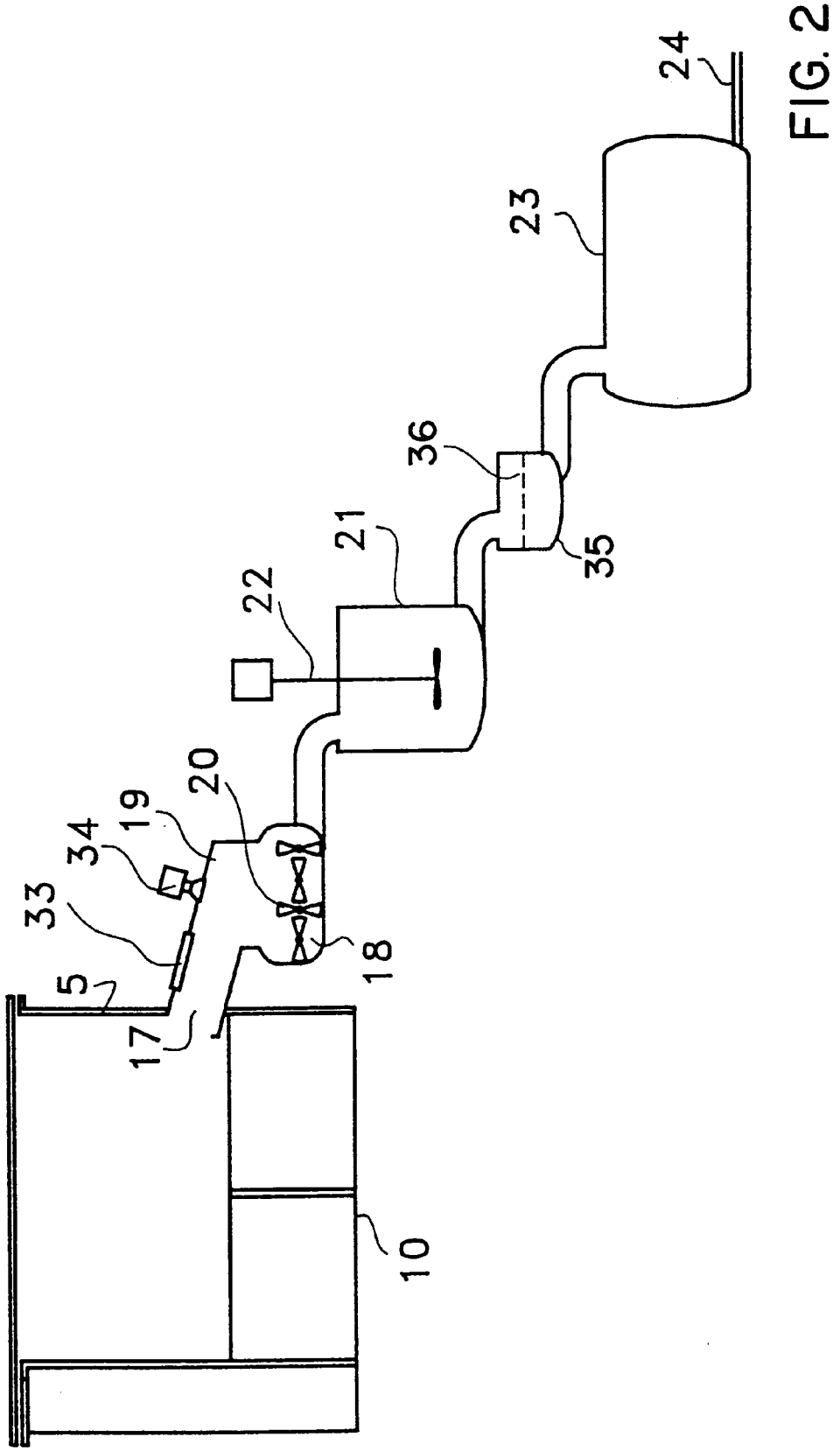
FIG. 2 is a vertical, sectional view along the line 2—2 in FIG. 1.
Figure 3:
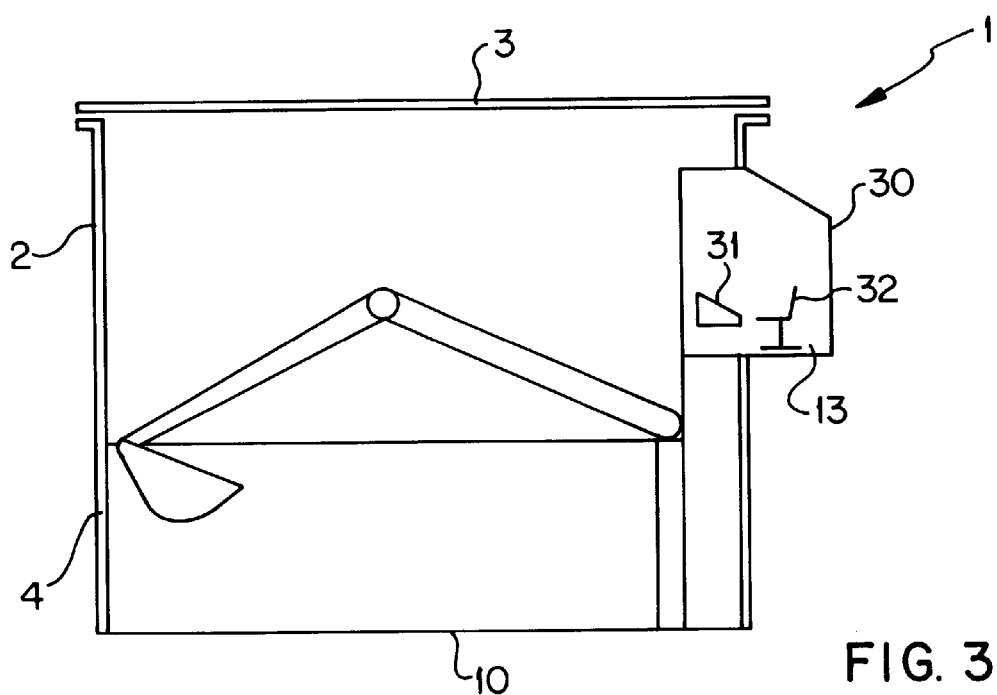
FIG. 3 is a vertical, sectional view along the line 3—3 in FIG. 1, FIG. 4 illustrate in a diagrammatic and simplified form another embodiment of the waste processing plant, seen in a top view without the upper part.

The container 1 shown in FIGS. 1 to 3 comprises a lower part 2 and an upper part 3. The lower part 2 is shown in details on the FIG. 1, from which it is evident that the part has an outer wall 4, 5 shaped as a segment of a circle, in the embodiment shown as a semicircle.

The upper part 3 is adapted to fit the outer walls of the lower part and is arranged on top thereof. The indicated outer walls 4,5 are preferably vertical. The upper part 3 forms the ceiling, whereby the container 1 is a closed container.

By means of partition walls 8 extending as radii in the circle, the lower part 2 is divided into a plurality of tanks or vessels 9 open at the top and defined at the bottom by a floor 10 for the entire lower part. Each tank is provided with an inlet sluice opening 11 via the circular outer wall 4 for feeding a waste portion 12 to the tank. A digging means or an excavator 13 is arranged in a stationary manner in the centre of the circle and provided with a bucket arm 15 having a bucket 14. The arm 15 is movably arranged above any of the tanks by revolving about the centre of the circle, whereby it can operate above the upper edges of the individual partition walls 8. On FIG. 3 a control room 30 is shown provided with a control panel 31 for the excavator 13 and a seat 32 for an operator, who can see into the container 1 through a window in the control room 30.

The outer wall 5 is provided with an outlet opening 17 leading to a trough 18 having a stirring means 20 driven by a motor (not shown) and having an essentially horizontal axis. The trough 18 and the stirring means 20 form an intermediate mixer, to which the mixed waste is transferred subsequent to its removal from the container 1. The intermediate mixer 18, 20 has a relatively large capacity, e.g. from 5 to 20 m$^3$. It may thus contain several admixed waste portions from the tanks 9, and thus forms a buffer portion able to contain at least the waste portions removed from five tanks 9. If one of these waste portions is particularly explosive, said portion is diluted in the intermediate mixer 18,20, whereby the danger of the resulting, pumpable and combustible waste exploding is limited. The trough 18 of the intermediate mixer is closed at the top by means of a plate 19 provided with a sight glass 33, and possibly a video camera 34, so that the operator may check the condition of the waste material. The waste is passed from the intermediate mixer 18,20 to an end mixer 21, in which it is ground by means of a power-driven stirring means 22, while a high shear is applied. From the end mixer 21, the material is passed via a vibration filter 35 having a filter element 36 to a flow tank 23, from the outlet 24 of which the waste material being a pumpable and combustible mixture is passed to combustion nozzles in a incineration plant (not shown). If the viscosity in the end mixer is too high, liquid may be added, possibly a drained liquid phase from the waste portions.

The container is made of steel and mounted on a concrete base (not shown). The inner faces of the individual tanks are preferably coated with a chemical inert material protecting the steel container against the reactive chemicals in the waste portions. As indicated on the sectional drawing in FIG. 3, the shovel or bucket means 13 is arranged in such a manner that the bucket 14 does not extend quite to the outer walls in the individual tanks 9. The upper part 3 preferably rests on the lower part 2 as a result of its weight, whereby it at a major explosion is lifted off of the lower part and thus removes the pressure. The upper part may also be attached to the lower part by means bolts (not shown) bursting when a predetermined pressure threshold is exceeded.

Figure 4:
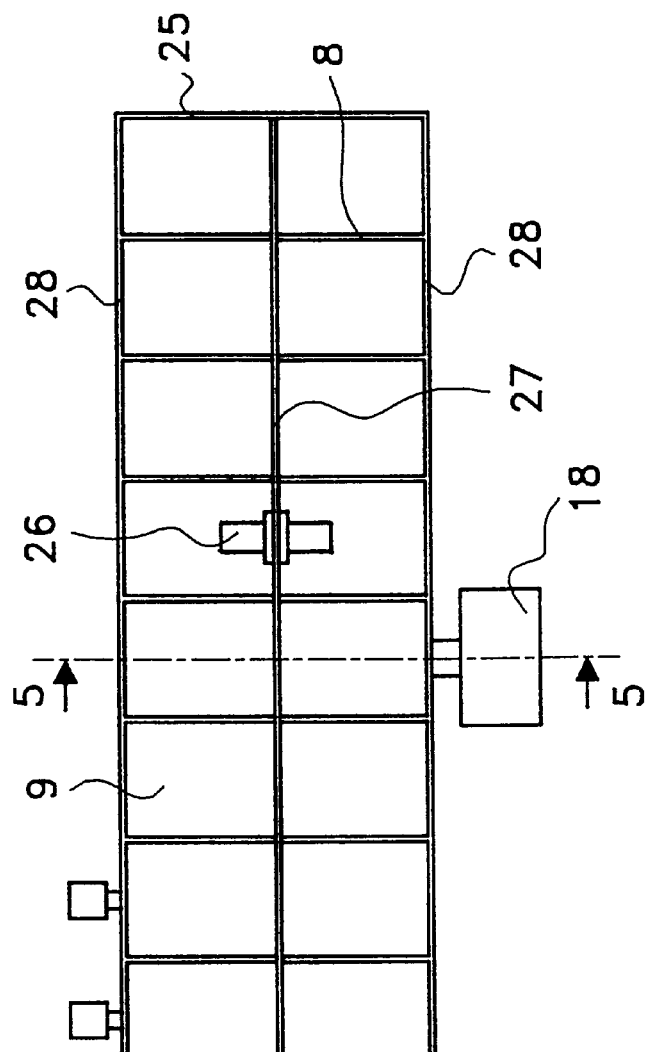
Figure 5:
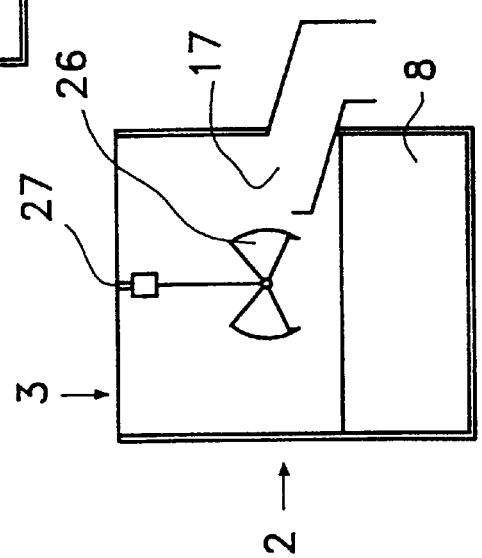
FIG. 5 is a vertical, sectional view along the line 5—5 in FIG. 4.
Figure 6:
FIG. 6 is a photograph of sample 4 prior to treatment according to Example 2.
Figure 7:
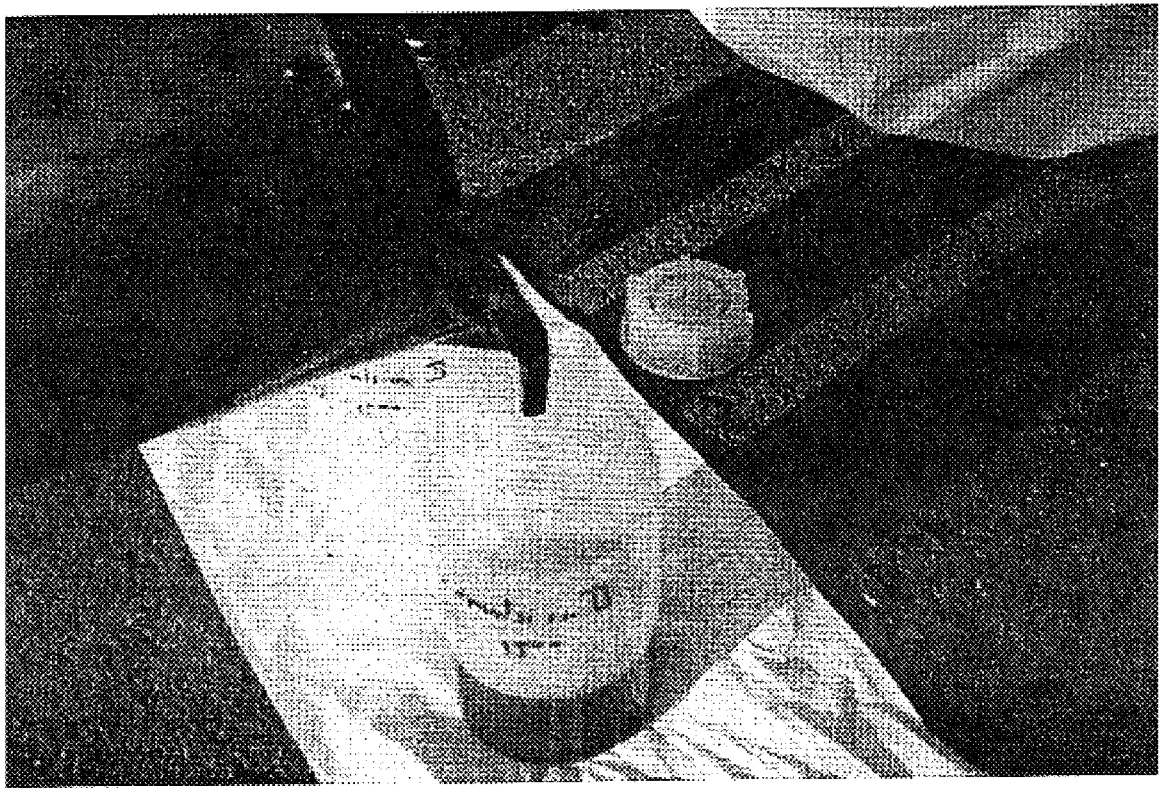
FIG. 7 is a photograph of dispersion B obtained according to Example 2.
Figure 8:
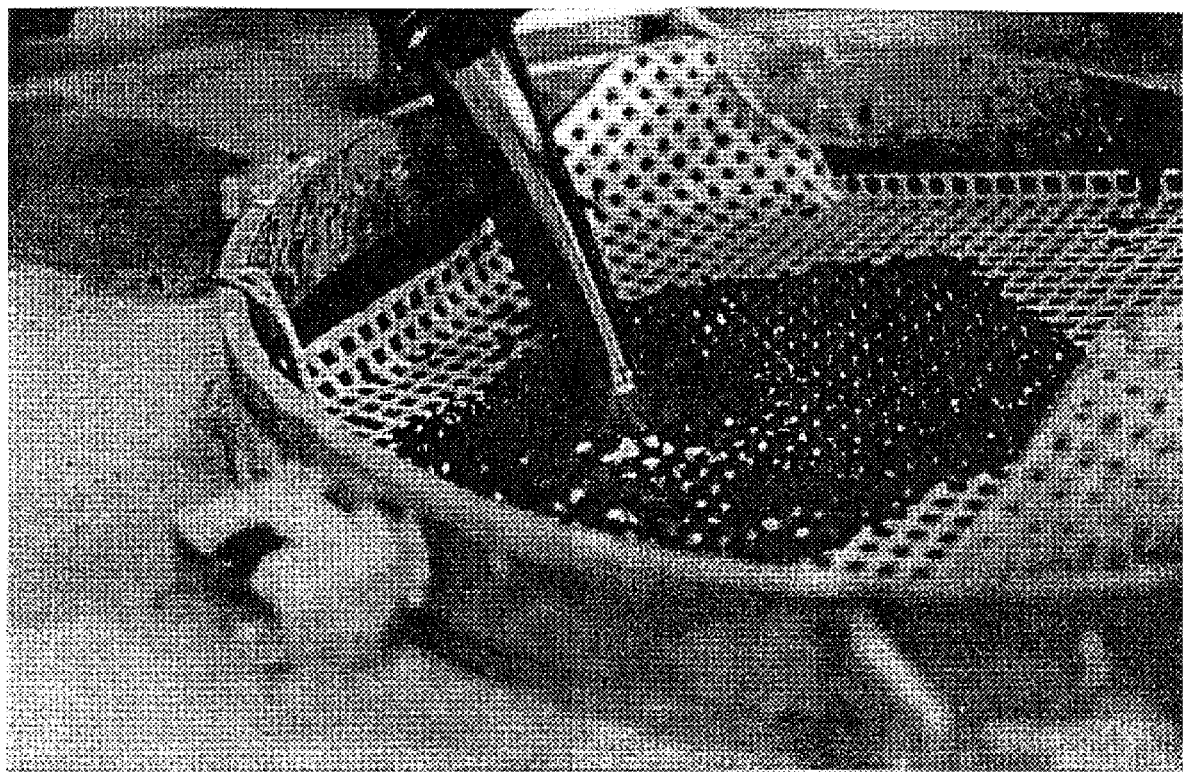
FIG. 8 is a photograph of another dispersion obtained by the inventive treatment of chemical waste. As it appears, only a small portion thereof is retained by a mesh provided to ensure that the nozzle of the burner are not clogged.

FIGS. 4 and 5 illustrate in a diagrammatic and simplified form and in a sectional view along line 5—5, respectively, a further embodiment of the container, seen in a top view without the upper part. In particular, this embodiment is selected, if more tanks than possible in the embodiment shown in FIGS. 1 to 3 are desired. The parts in FIGS. 4 and 5 have the same reference numerals as the corresponding parts in FIGS. 1–3. As can be seen, the ground plan of the container is of a rectangle shape. In this embodiment, the partition walls 8 of the lower part extend parallel with the short sides 25 of the rectangular. In the embodiment in FIGS. 4 and 5, a travelling crane 26 is used instead of the excavator 13 of FIGS. 1 to 3, said crane being slidaible in the longitudinal direction of the rectangle on a track 27 parallel with the long side 28 of the rectangle. In the embodiment of FIGS. 4 and 5, a plurality of tanks 9 are provided to receive the waste portions, and an outlet opening 17 is provided in a lateral wall 28, said opening passing the waste portions to the intermediate mixer 18, 19, 20, to the end mixer, and further to the flow tank 23.

Then invention is explained in detail in the following examples. If not otherwise indicated, the parts and percentages are based on weight.

EXAMPLE 1

A waste processing plant receives a wide range of chemical wastes in solid, paste-like or liquid form, often as heterogeneous mixtures, on a continuous basis. Each type of waste is received in large or small portions, usually in closed containers, typically containing approximately 200 litres.

Heterogeneous waste portions containing a liquid phase are drained. The resulting liquid phases are combined with the incoming liquid waste portions in a solvent setting tank, in which the pooled liquid phases and portions are allowed to stand, whereafter an equilibrium will be obtained, usually in such a manner that incompatible solvents separate into two or more phases.

Even though the type and amount of the incoming solvents may vary, experience has shown that statistically a considerable equalization of such differences is obtained. Typical solvents normally occurring in substantial amounts are:

aromatic solvents, such as toluene, xylene and benzene;
esters, such as ethylacetate, methylacetate and butylacetate;
ketones, such as acetone, methylethylketone and isobutylketone;
alcohols, in particular polyglycols, ethylglycol and isobutylalcohol; and
polluted water, such as process water.

When the combined solvents subsequent to standing are in equilibrium, a non-polar phase (in particular aromatic solvents) normally is formed at the top and a polar phase containing esters, ketones, alcohols and water is formed at the bottom. However, often one or more transition phases with or without a definite interface are also present. In practice, each individual compound is distributed in the separate phases in a ratio depending on the compatibility of the compound with the other constituents in the phase.

However, it is not necessary to know the exact composition of each phase, and for instance two fractions may be chosen, a polar and a non-polar phase, or three or more fractions from different levels may be selected.

The desired number of fractions (I, II . . . ) are selected and each fraction is accumulated in a separate reservoir.

In practise, the phase separation between the combined solvents is carried out in a receiver being filled continuously, each of the separated fractions is thus removed and transferred to its separate reservoir as new amounts of solvent is added to the receiver. As a rule, the equilibrium between the phases is set within approximately one hour, which can be taken into account when dimensioning the receiver. It should, however, be assumed that it is not vital for the carrying out of the method according to the invention that a complete phase equilibrium is present prior to the removal of a solvent fraction.

One container portion at a time of the solid or semi-solid (viscous) waste portions is fed into one of the tanks in the closed plant shown in FIG. 1–3.

Once a portion has been fed into a tank, a test of its compatibility with one or more of the liquid fractions (I, II . . . ) is made. In practise, said test is carried out by the operator, adding a small portion of the liquid fraction and observing the waste portion in the defined area, to which the liquid fraction has been added. Moreover, the operator performs mixing movements in said area by means of the shovel or bucket means of the plant.

If the test sub-portion of the waste portion mixed with the solvent fraction assumes a uniform colour with a glossy surface, the compatibility test is positive. If, however, the waste portion and the liquid fraction provide the material with a gritty, heterogeneous surface, the test is negative. If so, the operator repeats the compatibility test with another of the liquid fractions.

When the individual waste portions have been classified as regards compatibility with one of the liquid fractions, the minimum necessary amount of liquid fraction is added to the waste portion and simple mixing movements are carried out by means of the shovel or bucket means of the plant.

Subsequent hereto, if required, mixing tests with two or more of the waste portion in the tanks may be performed followed by further combination and mixing of the waste portions in the tanks or the waste may be transferred in small portions directly to an intermediate mixer containing e.g. a total of 10 m$^3$ waste in form of a buffer portion. In principle, the processing in the intermediate mixer and the subsequent processing is carried out as described in EP patent No. 73 787 and shown in the Figure therein.

The intermediate mixer may be a pawl or paddle mixer designed as a trough provided with one or more shafts having a plurality of radially projecting paddles or plates. Typically, the shafts may rotate at a speed of 20–25 rotations per minute.

The waste material is processed in the intermediate mixer, additional solvent being added, if required, to obtain of suitable viscosity being determined visually. Usually, only addition of water as the additional solvent is required. The processing continues, until the waste material is sufficiently homogenized, said condition being determined visually, homogenous waste having a glossy surface, and a heterogeneous waste having a gritty surface.

When the buffer portion is homogenized, a portion thereof, for instance of 2 m$^3$ is taken out of the intermediate mixer. This portion is transferred to a high speed mixer comprising a container provided with a stirring means with a vertical shaft, such as a dissolver. The circumferential speed of the stirring means is typically 20–30 m/sec.

The stirring means in the high speed mixer comminutes any remaining solid lumps and dissolves or disperses these in the solvent. If necessary, additional solvent may be added, for instance water, to obtain the desired viscosity. It is, however, preferably that the necessary additions of solvent has already been carried out in the intermediate mixer. An essentially homogeneous mixture is obtained in form of a pumpable dispersion with a viscosity at 20° C. of between 0.27 and 0.85 Pa·s, preferably between 0.45 and 0.70 Pa·s. This portion is transferred to a storage container through a filter. The materials accumulated in the filter may be recirculated to the process. By utilizing such a recirculation, the demand on the pumpable dispersion is decreased. A shorter stirring time is thus required in the high speed mixer.

The pumpable dispersion may be atomized into a combustion furnace, e.g a cement kiln, through a nozzle. The use of a cement kiln is advantageous in that an alkaline environment with high temperatures is present so that any metals in the waste will be bound as oxides or collected in electro filters.

As the different waste portions are thoroughly admixed or "diluted" with other types of waste, a portion of particularly active waste will be sufficiently diluted, whereby deflagration and explosions are avoided during the intensive mechanical processing or during feeding to the combustion furnace.

After a portion of 2 m³ homogenized waste has been removed from the buffer portion in the intermediate mixer, the feeding of new waste portions thereto may continue as described above.

In this manner, each waste portion may be gradually passed on from the tanks of the plant, however, occasionally some portions cannot initially be mixed with the other portion to obtain a homogeneous mixture. Such portions can be "left", until a suitable waste portion being compatible therewith is received. Variations in the different liquid solvent fractions may also occur, for which reason the operator occasionally may test, if the difficult waste portion has obtained compatibility with one of the liquid solvent fractions present in the reservoirs at the time in question. In particularly difficult cases, it is possible to add a particularly suitable additional solvent, although this—naturally—should be avoided for economic reasons.

EXAMPLE 2

The present example describes a practical, small scale test carried out in the course of two days.

A conventional mortar mixer without mixer arms was used for the initial mixing and for the subsequent formation of a buffer portion. In order to ensure a coarse grinding and mixing, some bricks, i.e. die-shaped stones of a size of approximately 10×10×10 cm³, were placed in the mortar mixer.

For the final processing involving high shear, the material was stirred in an open, bowl-shaped container by means of a drilling machine provided with a stirring propeller at high speed, approximately 1000 rotations per minute.

Materials

The following wastes were treated:

Sample 1: Distillation residues, a blackish brown, solid/liquid material from the chemical industry. The material has a chlorine content of 5.8%, an ash content of 0.13%, a water content of 28.93% and a calorific value of 14.98 MJ/kg.

Sample 2: Synthetic resin waste, a coloured, partially translucent, rubbery material from the chemical industry. The material has a nickel content of 7.28 mg/kg and a calorific value of 43.03 MJ/kg.

Sample 3: Distillation residues, a greyish brown, solid, crumbly material from the chemical industry. The material has a chrome content of 1.96 mg/kg, a nickel content of 4.0 mg/kg, an ash content of 0.4%, and a calorific value of 34.08 MJ/kg.

Sample 4: Hard resin waste, amber-coloured hard material in fragments of a size up to 5 cm from the chemical industry. The material has a sulphur content of 0.12%, a nickel content of 5.09 mg/kg, an ash content of 5.08%, and a calorific value of 35.85 MJ/kg.

Sample 5: Solvent-containing sludge, black, solid, crumbly material from the chemical industry. The material contains 0.38% of chlorine, 1.71% of ash, 43.07% of water, 67.1 mg/kg of chrome, 2.29 mg/kg of copper, 51.8 mg/kg of nickel and has a calorific value of 16.48 MJ/kg.

Sample 6: Glycol mixture, white, solid, in fragment of a size up to 15 cm from the chemical industry. The material contains 6.142 mg/kg of antimony, 0.54% of ash, 3.95% of water, and has a calorific value of 24.90 MJ/kg.

Sample 7: Lacquer wastes, light-grey, solid, foam structure in blocks of 20 cm×20 cm×40 cm from the paint industry. The material contains 17.9 mg/kg of chrome, and has a calorific value of 26.09. MJ/kg.

Sample 8: Distillation residue, a black, pastose material with coloured spots. The material contains 193 mg/kg of antimony, 7.1 mg/kg of arsenic, 5370 mg/kg of lead, 1 mg/kg of cadmium, 890 mg/kg of chrome, 1813 mg/kg of copper, 44.3 mg/kg of nickel, 0.48% of chlorine, 0.38% of sulphur, 21.7% of ash, and 18.23% of water, and has a calorific value of 15.63 MJ/kg.

Sample 9: Distillation residues, sort, sludge-like material. The material contains 4.72 mg/kg of antimony, 270 mg/kg of lead, 54.2 mg/kg of chrome, 1990 mg/kg of copper, 7.25 mg/kg nickel, 0.81% of chlorine, 0.12% fluorine, 0.45% of sulphur, 4.53% of ash, and 3.5% of water. The calorific value is 27.79 MJ/kg.

Sample 10: Photochemical salts, light brown paste obtained by distillation. The material contains 132 mg/kg of chrome, 5.9 mg/kg of copper, 7.85 mg/kg of nickel, 0.65% of chlorine, 26.6% of sulphur, 35.67% of ash, and 14.93% of water. The calorific value is 6.29 MJ/kg.

Sample 11: Glycol mixture a white, viscous to paste-like mass from the chemical industry. The material contains 12300 mg/kg of antimony, 0.16% of chlorine, 0.13% of sulphur, 0.4% of ash and 17.62% of water. The calorific value is 20.8 MJ/kg.

OPLM: Used solvents having a content of aromatic solvents (benzene, toluene and xylene, BTX) of 6.33%. A further analysis shows 2.54 mg/kg of antimony, 144 mg/kg of lead, 35.4 mg/kg of chrome, 47.3 mg/kg of copper, 9.1 mg/kg of nickel, 4.1% of chlorine, 0.67% of sulphur, 0.59% of ash, and 27% of water. The calorific value is 34.74 MJ/kg.

In addition to these waste materials, xylene, toluene, and tap water were used.

Test Implementation:

Tests in the mortar mixer were carried out in the open air at 3–15° C. The final homogenizing was carried out at room temperature. The initial materials were stored in the open. The obtained dispersion samples were stored at room temperature, if not indicated otherwise. The dispersions prepared in the mortar mixer were stored in the open.

On the first day, samples of all of the materials available were mixed to ascertain whether they were compatible and whether stable dispersions were obtainable.

Initially, a basic mixture were prepared by mixing 2 kg of distillation residue from paint distillation (sample 8), 200 g of synthetic resin waste (sample 2), 1 kg of hard resin waste (sample 4), 1 kg of solvent-containing sludge (sample 5), and about 2 litre of toluene. This mixture was processed in the mortar mixer with eight bricks (approx. 10 cm×10 cm×10 cm) for half an hour. One litre of water was then added, the mixture was stirred for yet half an hour. The resulting mixture was dark-grey going on black.

The mixture was built up by additional portions of distillation residues of 1 kg (sample 1 and sample 3) and glycol mixture (sample 6). Subsequent to yet another hour's mixing, a sample on 0.5 litre was taken out and shaken for 20 minutes by means of the drilling machine provided with a propeller at the top speed, 1000 rotations per minute. A homogenous, greyish black, viscous mass was obtained which did not display any phase separation.

Within three hours, while being continuously stirred, the additional materials stated in Table 1 under item A were slowly fed into the mortar mixer and then stirred for approx. one additional hour. Another sample was taken, while said materials were being added, whereby it proved impossible to completely grind the soft synthetic resin (sample 2) and the very elastic lacquer waste with air inclusion (sample 7) in the mortar mixer. The processing of the sample with the high speed mixer resulted in a good homogenizing. The two samples taken during the built-up of the dispersion showed strong thixotropic properties, as they became solid on standing, and liquid again at stirring.

The distillation residue added at the end of the test (sample 9), containing a clearly higher portion of solvent, reduced the thixotropic property and resulted in a general reduction in the viscosity, i.e. improved flowability. At the end of the first day, about 30 litres of dispersion A was present in the mortar mixer in total. Postprocessing of samples on 2 litres in the high speed mixer resulted in dispersion A for analysis.

The order of the feeding of the individual waste materials was determined during the test on the basis of the evaluation of the material in the mortar mixer. The surface of the material is an essential feature, as a uniform colour and a high gloss is a sign of good compatibility between the mixed materials. A gritty surface structure indicates a limited compatibility.

On the second day, a second dispersion was built-up for obtaining an optimized viscosity. ¼ of the obtained dispersion A remained in the mortar mixer and was used as the initial dispersion. In the course of the morning, the materials stated in Table 1 under item B were added under continuous stirring. After a six-hour stirring in total, a homogenous dispersion B was obtained. During this test, some cellulose pocket handkerchiefs and the latex disposable gloves used during the test were fed into the mortar mixer and disintegrated completely. Two-litre samples were stirred for ten minutes with a drilling machine and propeller and resulted in dispersion B.

Moreover, one litre of dispersion A and 1 litre of dispersion B were mixed for 15 minutes under vigorous stirring to form the dispersion A+B. Dispersions A, B and A+B displayed no differences in appearance. On the surface and in particular at the edges, a very thin water layer was visible. After a seven-day period at room temperature, no changes were apparent, and specifically no phase separation. Dispersions were viscous having been left to settle for one day. The dispersion became liquid when slightly stirred. The main portions of the dispersions stored in the open were liquid and had a slightly foamlike surface produced by degassing of the air saturated dispersion. These samples did not display any phase dispersion.

After four weeks, the dispersion stored at −8° C. was completely unchanged from the date of preparation as regards the texture. The below Table 1 illustrates the composition of the prepared dispersions.

TABLE 1

| Sample | Type | Composition in kg approx. | |
|---|---|---|---|
| | | A | B(+¼A) |
| 1 | Distillation residue | 2 | 3 |
| 2 | Synthetic resin waste | 0.5 | — |
| 3 | Distillation residue | 2 | 2 |
| 4 | Hard resin waste | 1 | 2 |
| 5 | Solvent-containing sludge | 2 | 2 |
| 6 | Glycol mixture | 4 | 4 |
| 7 | Lacquer residues | 0.5 | — |
| 8 | Distillation residues | 2 | — |
| 9 | Distillation residues | 6 | 8 |
| 10 | Photochemical salts | 3 | 3 |

TABLE 1-continued

| Sample | Type | Composition in kg approx. | |
|---|---|---|---|
| | | A | B(+¼A) |
| 11 | Glycol mixture | — | 1 |
| OPLM | Used solvent | — | 3 |
| | Xylene | 2.5 | — |
| | Toluene | 2.5 | — |
| | Water | 1 | 3 |

Analyses

The initial materials and the dispersions were analyzed for determining important parameters, such as the calorific value, the water content, the ash content, the chlorine content, and the content of heavy metals. The analysis results obtained are stated above at the description of the individual samples, only the analysis results above the limit of detection being stated. The analysis results for the dispersions A, B, and A+B appear from Table 2 below.

TABLE 2

| | Dispersion | | | |
|---|---|---|---|---|
| | A | B | A + B | |
| PCB | <0.5 | <0.5 | <0.5 | ppm |
| Chlorine | 0.63 | 0.77 | 0.66 | % |
| Fluor | <0.1 | <0.1 | <0.1 | % |
| Sulphur | 1.7 | 3.7 | 2.1 | % |
| Ash | 9.41 | 10.28 | 9.78 | % |
| Water | 21.54 | 20.5 | 21.2 | % |
| Calorific value | 21.87 | 12.31 | 19.40 | MJ/kg |
| BTX | 17.9 | 6.5 | 11.9 | % |
| Benzene | 0.5 | 0.25 | 0.4 | % |
| Toluene | 5.9 | 1.8 | 3.8 | % |
| m-xylene and p-xylene | 10.7 | 4.0 | 7.1 | % |
| o-xylene | 0.75 | 0.37 | 0.53 | % |
| Antimony | 274.0 | 380.0 | 377.0 | mg/kg |
| Arsenic | <0.2 | <0.2 | <0.2 | mg/kg |
| Lead | 705.0 | 202.0 | 385.0 | mg/kg |
| Cadmium | 1.0 | <1.0 | <1.0 | mg/kg |
| Chrome | 113.0 | 81.3 | 102.0 | mg/kg |
| Copper | 3464.0 | 1175.0 | 2350.0 | mg/kg |
| Nickel | 11.37 | 10.6 | 9.98 | mg/kg |
| Mercury | <0.2 | <0.2 | <0.2 | mg/kg |
| Selene | <0.2 | <0.2 | <0.2 | mg/kg |
| Tellurium | <1.0 | <1.0 | <1.0 | mg/kg |
| Thallium | <0.2 | <0.2 | <0.2 | mg/kg |
| Vanadium | <0.5 | <0.5 | <0.5 | mg/kg |

The content of ash and water and the calorific value for the initial materials and the dispersions are shown in Table 3:

TABLE 3

| Sample | Calorific value MJ/kg | Water content % | Ash content % |
|---|---|---|---|
| 1 | 14.08 | 28.93 | 0.13 |
| 2 | 43.03 | <0.1 | <0.1 |
| 3 | 34.08 | <0.1 | 0.4 |
| 4 | 35.85 | <0.1 | 5.08 |
| 5 | 16.48 | 43.07 | 1.71 |
| 6 | 24.90 | 3.95 | 0.54 |
| 7 | 26.09 | <0.1 | <0.1 |
| 8 | 15.63 | 18.23 | 21.7 |
| 9 | 27.79 | 3.5 | 4.53 |
| 10 | 6.29 | 14.93 | 35.67 |
| 11 | 20.80 | 17.62 | 0.4 |
| OPLM Dispersion | 34.74 | 27.0 | 0.59 |

TABLE 3-continued

| Sample | Calorific value MJ/kg | Water content % | Ash content % |
|---|---|---|---|
| A | 21.87 | 21.54 | 9.41 |
| B | 12.31 | 20.50 | 10.28 |
| A + B | 19.40 | 21.2 | 9.78 |

The calorific values for the obtained dispersions A and A+B 21.87 MJ/kg (approx. 5200 kcal/kg) and 19.4 MJ/kg (approx. 4600 kcal/kg), respectively, are within the range of the minimum requirement (20.9 MJ/kg or 5000 kcal/kg) for liquid fuel substitutes for use in the cement industry. In comparison, the calorific value for methanol is approximately 5000 kcal/kg.

The water contents in the prepared dispersions are uniform and between 20 and 22 percent. The comparatively high ash content in the dispersions mainly comes from the high quantity of ash in sample 8 and 10.

The content of PCB in the initial materials and in the dispersions is below 0.5 ppm. The chlorine content in the prepared dispersions is below 1%.

The sulphur content of 1.7% in dispersion A, the 3.7% in dispersion B, and the 2.1% in dispersion A+B is practically exclusively from the photochemical salts in sample 10.

The content of heavy metals appears from Table 4. Moreover, the content of Hg, Se, Te, Tl and V were determined, said contents being below the limit of detection in all of the analyses, viz. Hg<0.2 ppm, Se<0.2 ppm, Te<1 ppm, Tl<0.2 ppm and V<0.5 ppm.

TABLE 4

The content of heavy metals (ppm)

| Sample | Sb | As | Pb | Cd | Cr | Cu | Ni |
|---|---|---|---|---|---|---|---|
| 1 | <0.2 | <0.2 | <0.5 | <0.5 | <0.5 | <0.5 | <0.5 |
| 2 | <0.2 | <0.2 | <0.5 | <0.5 | <0.5 | <0.5 | 7.28 |
| 3 | <0.2 | <0.2 | <0.5 | <0.5 | 1.96 | <0.5 | 4 |
| 4 | <0.1 | <0.2 | <0.2 | <0.5 | <0.5 | <0.5 | 5.09 |
| 5 | <0.2 | <0.2 | <0.5 | <0.5 | 67.1 | 2.29 | 51.8 |
| 6 | 6142 | <0.2 | <0.5 | <0.5 | <0.5 | <0.5 | 0.5 |
| 7 | <0.2 | <0.2 | <0.5 | <0.5 | 17.9 | <0.5 | 0.5 |
| 8 | 193 | 7.1 | 5370 | <1 | 890 | 1813 | 44.3 |
| 9 | 4.72 | <0.5 | 270 | <1 | 54.2 | 1990 | 7.25 |
| 10 | 1.26 | <0.2 | <0.5 | <0.5 | 132 | 5.9 | 7.85 |
| 11 | 12300 | <0.2 | <2 | <1 | <1 | <2 | 2 |
| OPLM | 2.45 | <0.2 | 144 | <1 | 35.4 | 47.3 | 9.1 |
| A | 274 | <0.2 | 705 | <1 | 113 | 3467 | 11.37 |
| B | 380 | <0.2 | 202 | <1 | 81.3 | 1175 | 10.6 |
| A + B | 377 | <0.2 | 385 | <1 | 102 | 2350 | 9.98 |

It appears that a equalization (dilution) is obtained in the prepared dispersions of the large amount of antimony in samples 6 and 11, of the large amount of lead in sample 8, and of the large amount of chrome in sample 8, and of the nickel amount of samples 5 and 8.

The high values for copper in the dispersions A, B, and A+B cannot be explained on the basis of the original copper content in the waste samples. However, as the waste samples are very inhomogeneous, the analysis samples taken were apparently not representative.

Conclusion

The test proved that from the eleven different types of waste a homogenous and stable product, which can be stored, can be obtained. The found contents of ash and water are higher than calculated from the individual components, while the calorific values found are below the calculated values. This can be explained by the following:

1. The quantitative proportions in the dispersions and in the waste samples change at evaporation and at sampling and the like.
2. Some of the materials used may be hygroscopic and thus absorb water thereby reducing the calorific value.
3. The solvents evaporate. As a result, the calorific value decreases and the relative water content and ash content are increased. As an example, the toluene/xylene ratio is shifted in favour of the more non-volatile xylene and the total amount of toluene in dispersion A is approximately 30% less than the amount added.

If these explanations are correct, it appears that the water and ash contents may be reduced and the calorific value increased, if the method according to the invention is carried out in a closed plant, as shown in FIGS. 1–3.

EXAMPLE 3

The method described in Example 2 may be carried out on a large scale by initially using a mixer having volume of approximately 4 $m^3$ instead of the mortar mixer and by subsequently using a high speed mixer of approximately 2 $m^3$ provided with a mixing head having paddles rotating with a peripheral speed of 26 m/s and an engine power of approx. 92 kW (125 h.p.).

The above description of the invention reveals that it is obvious that it can be varied in many ways. Such variations are not to be considered a deviation from the scope of the invention, and all such modifications which are obvious to persons skilled in the art are also to be considered comprised by the scope of the succeeding claims.

I claim:

1. A method of processing liquid, solid and/or viscous, problematic, organic, chemical wastes for the disposal thereof, if possible by using the calorific value of the waste comprising the following steps:

a) the different types of waste, including liquid portions, solid or viscous portions and multi-phased portions, are collected in large or small, separate portions, b) the liquid phases are drained from multi-phased portions to achieve further liquid portions and solid or viscous portions, respectively, c) the liquid waste portions are pooled, and the resulting liquid mixture is left to separate into a number of fractions (I, II, . . . ), each fraction subsequently being transferred to a reservoir, d) each of the viscous or solid waste portions is subjected to a compatibility test to determine whether the waste portion is soluble or swellable in one of the liquid fractions, said compatibility tests being carried out by adding a small sample of liquid fractions, e) the waste portions, displaying solubility or swellability with one of the liquid fractions, designated waste type (I, II . . . ), are admixed with an amount of the fraction, ensuring that a workable mixture is obtained, whereby a number of mixtures is obtained, each designated as the relevant mixture types (I, II . . . ), f) the different mixtures are gradually mixed during further processing, if necessary, subsequent to preceding trial mixing of samples thereof, and possibly during admixing of additional liquid, so that a mixed and workable buffer portion is obtained as a result, said buffer portion containing a combination of the mixing types (I, II . . . ), any excess waste portions or mixtures being left for mixture with subsequent waste portions or mixtures, g) the buffer portion or a portion thereof is subjected to grinding at a high shear to form a pumpable, combustible material, which can be used as a fuel.

2. A method as claimed in claim 1, characterised in that the viscous or solid waste portions are fed into a covered, gasproof room provided with a plurality of tanks, each portion being placed in a separate tank upon receipt thereof.

3. A method as claimed in claim 2, characterised in that by means of a shovel or bucket means operational from the outside of the gasproof room, it is possible to transfer material from one tank to another, to perform simple mixing movements in the individual tanks, and moreover, that by means of said shovel or bucket means portions may be transferred to the inlet of a mixing means, wherein the buffer portion is treated.

4. A method according to claims 1, characterised in that it is carried out at ambient temperature.

5. A method as claimed in claim 1, characterised in that additional solvent selected from from the groups consisting of polar organic solvents, non-polar organic solvents and water are added
   1) to the pooled liquid mixture prior to standing thereof according to step c) in claim 1,
   2) to one or more of the fractions (I, II . . . ) formed at the separation of the liquid mixture and/or
   3) as independent fractions for use in one or more of the subsequent steps d)–g).

6. A method as claimed in claim 1, characterised in that a fine-grained material is added to the buffer portion, said material having a particle size of essentially less than 60 $\mu$m.

7. A method as claimed in claim 6, characterised in that the fine-grained material is selected from the group consisting of coal dust, filter dust, cellulose waste, fine-grained plastic granulate and bentonite.

8. A method as claimed in claims 1, characterised in that the buffer portion is processed in a mixer to obtain a dispersion having a smooth, non-gritty appearance; a sample thereof being taken for processing according to step g), subsequent to which and in accordance with steps a)–f) additional waste material is added to the buffer portion and then reprocessed to obtained the desired dispersion.

9. A method as claimed in claim 1, characterised in that a pumpable dispersion is prepared having a viscosity at 20° C. not exceeding 1.0 Pa·s.

10. A method as claimed in claim 9, characterised in that the pumpable dispersion has a viscosity at 20° C. between 0.27 and 0.85 Pa·s.

11. A plant for processing liquid, solid and/or viscous, problematic, organic, chemical wastes for the disposal thereof, if possible by using the calorific value of the waste, comprising:
   a) a means for collecting the different types of waste, including liquid portions, solid or viscous portions and multi-phased portions in large or small, separate portions;
   b) a means for separating the multi-phased portions to achieve further liquid portions and solid or viscous portions, respectively;
   c1) a means for pooling the liquid waste portions and containing the resulting liquid mixture when these are left to separate into a number of fractions (I, II, . . . ),
   c2) a number of reservoirs with means for transferring each of the fractions (I, II . . . ) to and from its reservoir;
   d) a means for subjecting each of the viscous or solid waste portions to a compatibility test to determine whether the waste portion is soluble or swellable in one of the liquid fractions, said compatibility tests being carried out by adding a small sample of liquid fractions;
   e) a means for admixing those of the waste portions displaying solubility or swellability with one of the liquid fractions, designated waste type (I, II . . . ) with an amount of the fraction, ensuring that a workable mixture is obtained, whereby a number of mixtures is obtained, each designated as the relevant mixture types (I, II . . . );
   f) a means for the gradual mixing of the different mixtures during further processing, if necessary, subsequent to preceding trial mixing of samples thereof, and possibly during admixing of additional liquid, so that a mixed and workable buffer portion is obtained as a result, said buffer portion containing a combination of the mixing types (I, II . . . ), any excess waste portions or mixtures being left for mixture with subsequent waste portions or mixtures; and
   g) a means for subjecting the buffer portion or a portion thereof to grinding at a high shear to form a pumpable, combustible material, which can be used as a fuel.

12. A waste processing plant as claimed in claim 11, characterised in that
   it comprises a closed container formed by a lower part, having a floor and outer walls, and an upper part forming a ceiling, said upper part arranged on the upper edges of the outer walls and designed to fit thereto,
   that the lower part by means of inner partition walls are divided into a plurality of tanks or vessels open at the top and being defined by the outer walls of the lower part,
   that essentially to each tank an inlet sluice opening is provided through an outer wall for feeding a waste portion to the tank,
   that an outlet opening is provided through an outer wall,
   that a shovel or bucket means provided in the interior of the container and operated from the outside thereof, is intended to transport material from said waste portions above the partition walls between the individual tanks and outlet.

13. A waste processing plant as claimed in claim 12, characterised in that an intermediate mixer is connected to the outlet opening and that the waste is passed from the outlet opening to the inlet end of the intermediate mixer.

14. A waste processing plant as claimed in claim 13, characterised in that the capacity of the intermediate mixer is relative large, whereby it may contain a large waste amount forming a buffer portion and in that it is formed as a trough having a power-driven stirring means.

15. A waste processing plant as claimed in claim 14, characterised in that the outlet end of the intermediate mixer is connected with an end mixer, to which the waste material is passed for grinding, the end mixer being provided with a power-driven stirring means subjecting the waste material to a high shear.

16. A waste processing plant as claimed in claim 14 wherein the capacity of the intermediate mixer is between 5 $m^3$ and 20 $m^3$.

17. A waste processing plant as claimed in claim 14 wherein the capacity of the intermediate mixer is about 10 $m^3$.

18. A waste processing plant as claimed in claim 12, characterised in that the upper part of the container is retained to the lower part by means of its weight.

19. A waste processing plant as claimed in claim 12, characterised in that the container is made of steel, and coated with a chemically resistant material on the inner face of the lower part.

20. A waste processing plant as claimed in claim 12, characterised in that the ground plan of the container is formed as a section of a circle and the partition walls of the lower part extending as radii in the circle, that the outer walls include curved outer walls which lie on the section of the circle and which each have an inner face, and that the shovel or bucket means is an excavator arranged in a stationary manner in the centre of the circle and provided with a bucket arm having a bucket, said arm being arrangeable above any of the tanks by revolving about the centre of the circle and having a maximum extension, whereby the bucket does not completely abut the inner faces of the curved onter walls.

21. A waste processing plant as claimed in claim 12, characterised in that the ground plan of the container is rectangular, the partition walls of the lower part extending parallel with the short sides of the rectangle and that the shovel or bucket is a travelling crane slidable in the longitudinal direction of the rectangle on a track parallel with the long sides of the rectangle.

* * * * *